US010255313B2

(12) United States Patent
Guan et al.

(10) Patent No.: US 10,255,313 B2
(45) Date of Patent: Apr. 9, 2019

(54) ESTIMATING DATABASE MODIFICATION

(71) Applicant: International Business Machines Corporation, Armonk, NY (US)

(72) Inventors: Ting Xu Guan, Beijing (CN); Shuo Li, Beijing (CN); Ping Liang, Beijing (CN); Ke Wei Wei, Beijing (CN); Xin Ying Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 14/856,719

(22) Filed: Sep. 17, 2015

(65) Prior Publication Data

US 2017/0083548 A1 Mar. 23, 2017

(51) Int. Cl.
*G06F 17/30* (2006.01)

(52) U.S. Cl.
CPC .. *G06F 17/30368* (2013.01); *G06F 17/30377* (2013.01); *G06F 17/30463* (2013.01); *G06F 17/30469* (2013.01); *G06F 17/30474* (2013.01)

(58) Field of Classification Search
CPC .................................. G06F 17/30474
See application file for complete search history.

(56) References Cited

U.S. PATENT DOCUMENTS

| | | | |
|---|---|---|---|
| 6,618,822 B1 * | 9/2003 | Loaiza | G06F 17/30368 707/999.202 |
| 8,255,388 B1 | 8/2012 | Luo et al. | |
| 8,577,871 B2 | 11/2013 | Dageville et al. | |
| 9,189,521 B2 | 11/2015 | Rajan et al. | |
| 9,275,249 B1 | 3/2016 | Allen | |
| 2008/0155545 A1 * | 6/2008 | Mignet | G06F 9/4881 718/102 |
| 2014/0214880 A1 | 7/2014 | Chi et al. | |

(Continued)

OTHER PUBLICATIONS

Chaudhuri, et al., "Estimating Progress of Execution for SQL Queries", SIGMOD 2004, Jun. 13-18, 2004, Paris, France, Copyright 2004 ACM 1-58113-859-8/04/06, pp. 803-814.

(Continued)

*Primary Examiner* — Kris E Mackes
(74) *Attorney, Agent, or Firm* — Pooya Shoghi Ghalehshahi; Steven L. Fisher-Stawinski; William H. Hartwell (57) ABSTRACT

A computer-implemented method includes identifying one or more database modification statements and identifying one or more operational unit indicators. The one or more operation unit indicators are caused to be generated by the one or more database modification statements. An anticipated operational size is determined. The anticipated operational size is an estimated total number of the one or more operational unit indicators. An anticipated operational throughput rate is determined. The anticipated operational throughput rate is a rate at which the operational unit indicators are expected to be generated. An anticipated total execution time of the one or more database modification statements is determined based on the anticipated operational size and the anticipated operational throughput rate. A corresponding computer program product and computer system are also disclosed.

20 Claims, 6 Drawing Sheets

(56) References Cited

U.S. PATENT DOCUMENTS

2015/0213090 A1   7/2015  Ajiro
2015/0248467 A1   9/2015  Buteau et al.

OTHER PUBLICATIONS

Guan et al., "Estimating Database Modification," U.S. Appl. No. 15/346,085, filed Nov. 8, 2016.
List of IBM Patent or Patent Applications Treated as Related, signed Nov. 8, 2016, 2 pages.

\* cited by examiner

ESTIMATING DATABASE MODIFICATION

BACKGROUND

The present invention relates generally to the field of database systems, and more particularly to estimating execution ratio and time in those systems.

Database systems are important to organized storage, access, and management of data on computer systems. Databases are typically modified through database modification statements. Database users and application developers continue to face challenges when estimating the execution properties of database modification statements.

SUMMARY

A computer-implemented method includes identifying one or more database modification statements and identifying one or more operational unit indicators. The one or more operation unit indicators are caused to be generated by the one or more database modification statements. An anticipated operational size is determined. The anticipated operational size is an estimated total number of the one or more operational unit indicators. An anticipated operational throughput rate is determined. The anticipated operational throughput rate is a rate at which the operational unit indicators are expected to be generated. An anticipated total execution time of the one or more database modification statements is determined based on the anticipated operational size and the anticipated operational throughput rate. A corresponding computer program product and computer system are also disclosed.

DETAILED DESCRIPTION

The present invention generally relates to database systems. In some embodiments, a database system comprises an organized collection of data (i.e. the "database") and a computer software framework (comprising one or more pieces of computer software) known as a database management system (DBMS).

Figure 1:
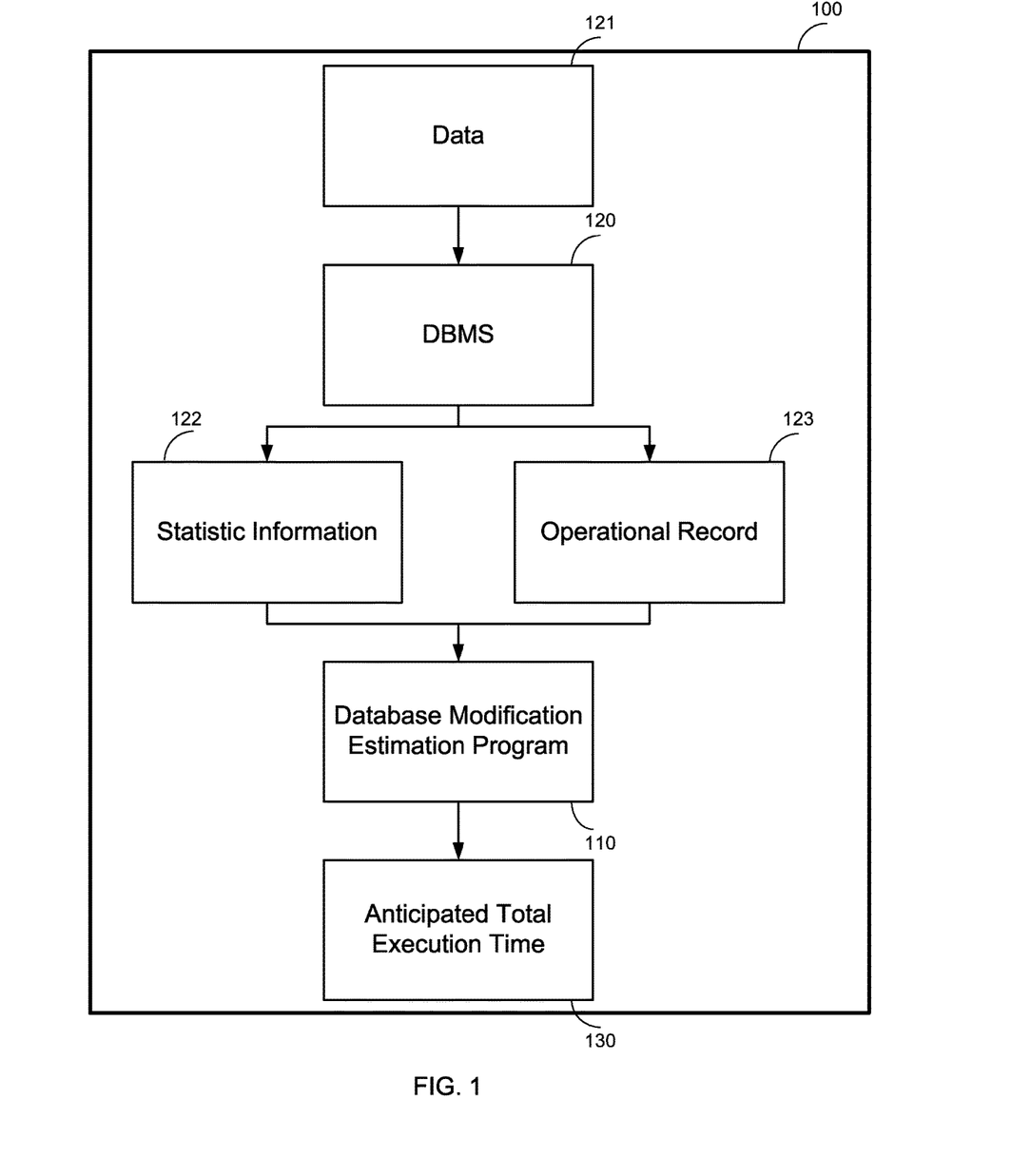
FIG. 1 is a block diagram of one embodiment of a database system environment suitable for operation of a database modification estimation program, in accordance with at least one embodiment of the present invention.

FIG. 1 is a block diagram of one embodiment of a database system environment suitable for operation of a database modification estimation program 110, in accordance with at least one embodiment of the present invention. In the database system environment depicted by FIG. 1, a DBMS 120 has access to one or more pieces of data 121 that it manages and/or organizes. A function of the DBMS 120 is to enable retrieval and modification of the data 121 requested through database retrieval statements (also known as "queries") and database modification statements respectively. Database modification statements contain requests for the DBMS 120 to modify the data 121. In some embodiments, a DBMS 120 supports one or more of three kinds of database modification statements and their one or more variants: insert statements, modification statements used to insert one or more new records into one or more tables of data 121; delete statements, modification statements used to delete one or more new records from one or more tables of data 121; and update statements, modification statements used to replace one set of one or more new records with another set of one or more new records in one or more tables of data 121. In some embodiments, the functionality offered by one or more update statements may be implemented by an alternative set of one or more database modification statements comprising one or more delete statements and one or more insert statements.

The DBMS 120 may record statistic information 122 about the data 121. In addition, the DBMS 120 may keep a record 123 of some or all operations (e.g. retrievals and modifications) it performs on the data 121. In some embodiments, such an operational record 123 consists only of the records of modifications to the data, and may be used to roll back at a future time some or all of the modifications to the data 121 recorded in the operational record 123. In the database system environment depicted in FIG. 1, the database modification estimation program 110 uses the statistic information 122 and the operational record 123 produced by the DBMS 120 to produce an estimation of the time it takes for a particular set of one or more database modification statement to be executed by the DBMS 120 (i.e. "the anticipated total execution time") 130.

Figure 2:
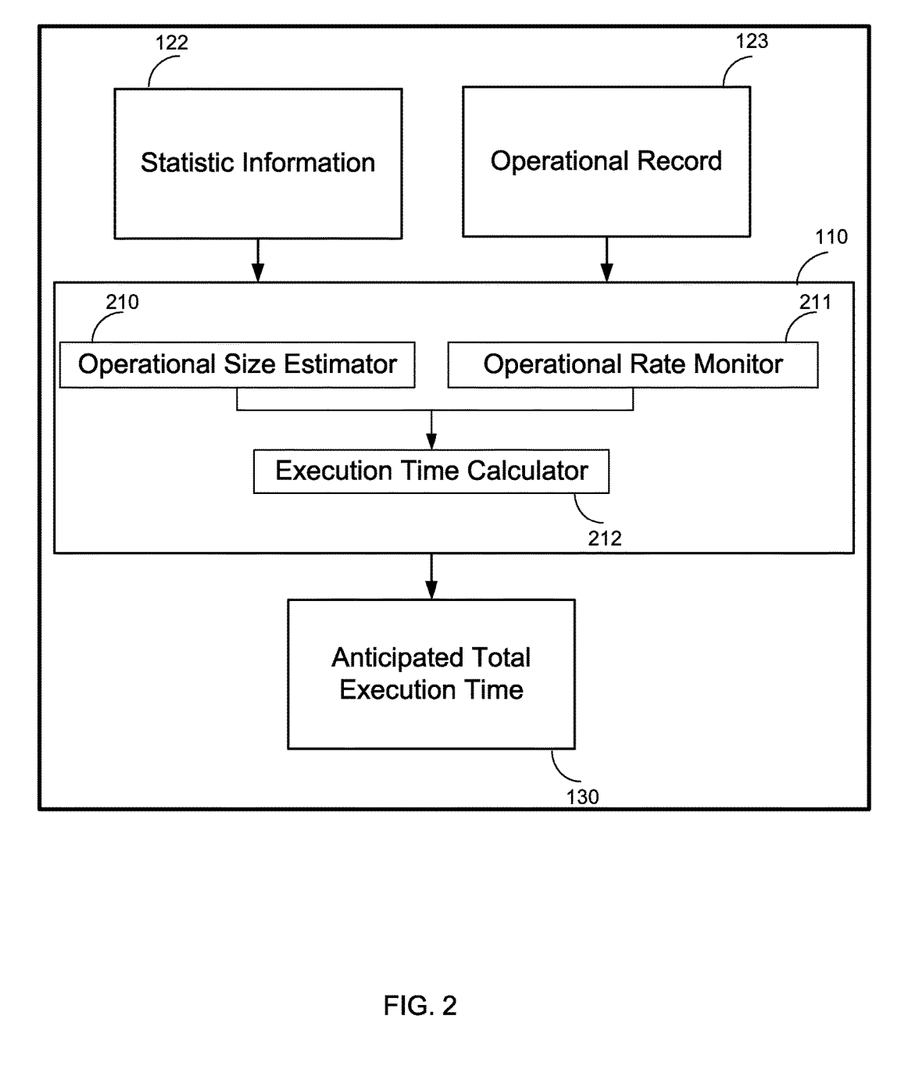
FIG. 2 is a block diagram of an operational environment for execution of a database modification estimation program, in accordance with at least one embodiment of the present invention.

FIG. 2 is a block diagram of an operational environment for execution of a database modification estimation program, in accordance with at least one embodiment of the present invention. In the operational environment depicted by FIG. 2, the database modification estimation program 110 uses the statistic information 122 caused to be generated by the DBMS 120 to estimate the "anticipated operational size" of a particular database modification statement through an operational size estimator 210. The anticipated operational size of a database modification statement may represent an estimation of the complexity of the statement's execution. In some embodiments, the anticipated operational size of a database modification statement is a measure of how many operational units the operational record 123 of the statement entails (or is estimated to entail).

In the embodiment depicted in FIG. 2, the database modification estimation program 110 also uses the operational record 123 caused to be generated by the DBMS 120 to determine the "anticipated operational throughput rate" of database system at one time through an operational rate monitor 211. The anticipated operational throughput rate of database system at one time may represent an estimation of the rate at which requested operations on data 121 are executed at that time. In some embodiments, the anticipated operational throughput rate of database system is a measure of how fast the operational units of the operational record 123 of a database modification statement are generated (or are expected to be generated).

In the operational environment depicted by FIG. 2, a component of the database modification estimation program 110 (the execution time estimator 212) uses the anticipated operational size of a database modification statement (generated through the operational size estimator 210) and the anticipated operational throughput rate of database system at one time (generated through the operational rate monitor 211) to determine the anticipated total execution time 130 of one or more database modification statements.

In some embodiments of the present invention, the operational record 123 of one or more database modification statements is based on a recovery log caused to be produced by the DBMS 120 as a result of the execution of the statements. A DBMS 120 may document modifications to the data 121, including modifications to the data 121 implemented in response to one or more database modification statements. The record of such a documentation is called a "recovery log" of the DBMS 120, often used to roll back modifications to the data at a future time. A recovery log may comprise one or more "log records." In some embodiments, the anticipated operational size of one or more database modification statements is the total number of log records produced as a result of those statements (or an estimation of that number).

Figure 5:
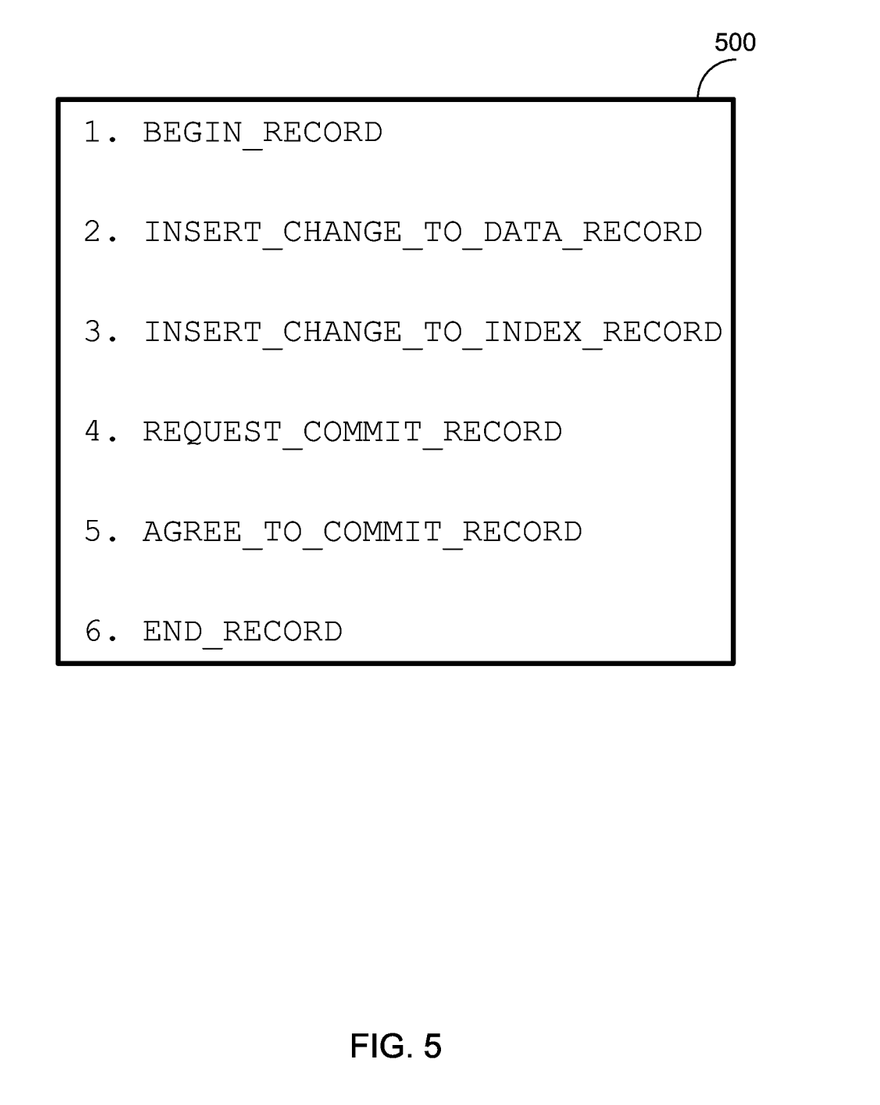
FIG. 5 is an operational example of a sequence of transactional log records, in accordance with at least one embodiment of the present invention.

FIG. 5 depicts an operational example of a sequence of log records 500 produced to document modifications to the data 121 produced as a result of an example database modification statement. In the operational example depicted by FIG. 5, the example recovery log 500 includes log records produced when one record of data is being inserted into one table as a result of an example insert statement. In line 1, there is a log record denoting the beginning of a modification operation. In line 2, there is a log record denoting insertion of a new record into the data 121. In line 3, there is a log record denoting insertion of a reference to the new record in the index to the data 121 maintained by the DBMS 120. In line 4, there is a log record denoting a request for committing (i.e. making permanent) the changes in the data 121 and the index to the data 121. In line 5, there is a log record denoting a confirmation of the request to commit the changes in the data 121 and the index to the data 121. In line 6, there is a log record denoting the end of a modification operation. In the operational example depicted by FIG. 5, the anticipated operational size of the example insert statement may be 6, as there are six log records in the recovery log produced as a result of the example insert statement's execution.

Figure 3:
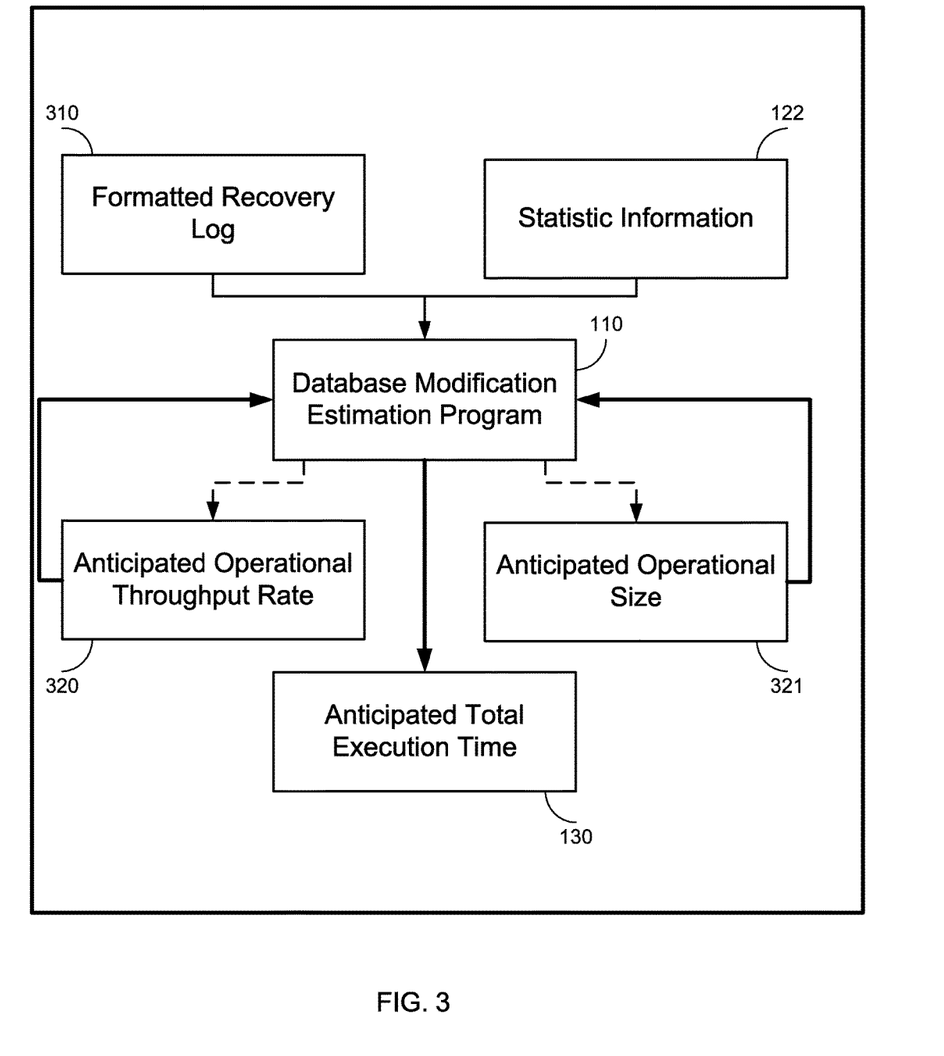
FIG. 3 is a data-flow diagram of a database modification estimation program using a recovery log, in accordance with at least one embodiment of the present invention.

FIG. 3 is a data-flow diagram of a database modification estimation program 110 using a recovery log, in accordance with at least one embodiment of the present invention. In the embodiment depicted by FIG. 3, the program 110 uses a formatted version of the recovery log 310 to determine the anticipated operational throughput rate 320 of the database system at one time. The recovery log needs to be formatted so the recovery log's operational unit indicators (such as, in some embodiments, log records) are marked as separated from one another in a manner discernable to the program 110. Existing software frameworks, such as the DSN1LOGP utility in IBM®'s DB2 for z/OS® 11.0.0, enable a person of ordinary skill in the art to format the contents of the recovery log.

In the embodiment depicted by FIG. 3, using the formatted recovery log 310, the database modification estimation program 110 may monitor the rate of generation of operational unit indicators in the recovery log to estimate the anticipated operational throughput rate 320 of the database system at one time. In some embodiments, the program 110 may count the number of operational units generated during a pre-defined fix time interval (e.g. 1 second) to estimate the anticipated operational throughput rate 320 of the database system at one time. In addition, the program uses the statistic information 122 about the data 121 to determine the anticipated operational size 321 of one or more particular database modification statements. Using the anticipated operational throughput rate 320 of database system at one time and the anticipated operational size 321 of one or more particular database modification statements, the program 110 may determine an anticipated total execution time 130 of one or more database modification statements.

Figure 4:
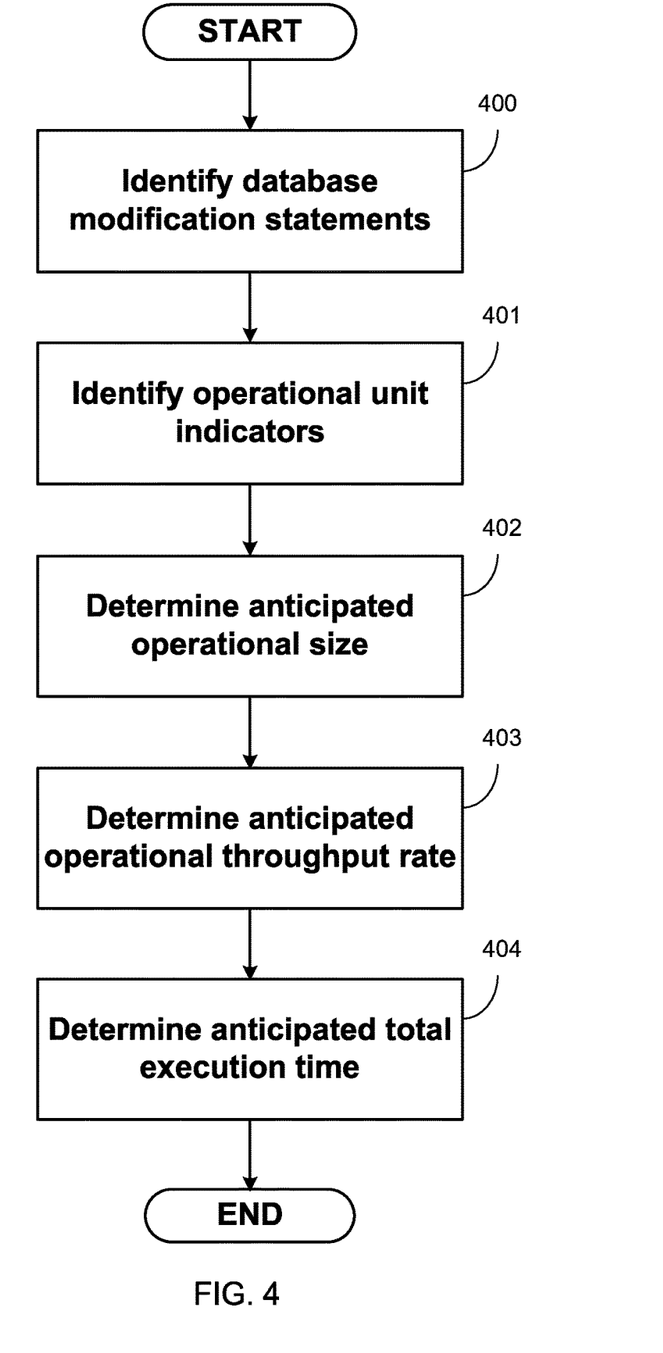
FIG. 4 is a flow-chart diagram of a database modification estimation program, in accordance with at least one embodiment of the present invention.

FIG. 4 depicts a database modification execution program to estimate the execution time of one or more database modification statements, in accordance with at least one embodiment of the present invention. At step 400, the program identifies one or more database modification statements. At step 401, the program identifies one or more operational unit indicators caused to be generated by the one or more database modification statements. At step 402, the program determines an anticipated operational size, where the anticipated operational size is an estimated total number of the one or more operational unit indicators. At step 403, the program determines an anticipated operational throughput rate, where the anticipated operational throughput rate is the rate at which the one or more operational unit indicators are expected to be generated. At step 404, the program determines an anticipated total execution time of the one or more database modification statement based on the anticipated operational size and the anticipated operational throughput rate.

In an exemplary embodiment, the database modification estimation program identifies a database modification statement requesting the deletion of one row from one table using an example delete statement. Using the statistical information caused to be produced by the DBMS, the program estimates that such database modification statement generates 6 recovery log records and thus determines that the anticipated operational size of the database modification statement is 6. The program also monitors the rate of the generation of log records by the DBMS in the recovery log and determines that 3 transactional log records are produced in one second. Therefore, the program determines that the anticipated operational throughput rate of the database system at the time of monitoring is 3 per second. The program estimates that it would take two seconds for the database modification statement to execute the example delete statement, and thus determines anticipated total execution time of 2 seconds for that database modification statement.

In some embodiments, the database modification estimation program works in conjunction with and/or as part of a software framework, such as a DBMS, that provides the program with operational records and statistical information needed to determine an anticipated operational throughput rate and an anticipated operational size. In an exemplary embodiment, the program determines the anticipated operational throughput rate through the operational record caused to be generated by the DBMS and determines the anticipated operational size through the statistic information caused to be produced by the DBMS, and uses the anticipated operational throughput rate and the anticipated operational size to determine the anticipated total execution time. In some alternative embodiments, the database modification estimation program works in the absence of the software framework described above. In some of those embodiments, the program uses other sources of information (such as pre-defined values or historic records supplied to it) to determine the anticipated operational throughput rate and/or the anticipated operational size. In some other embodiments, the program itself generates operational records for database modification statements and/or produces statistical information about one or more features of the database system. The program determines the anticipated total execution time based on the anticipated operational throughput rate and the anticipated operational size.

The database modification estimation program identifies one or more database modification statements at step 400. In some embodiments, the list of database modification statements comprise the insert statement, the update statement, and the delete statement as described above. In other embodiments, the list may include statements equivalent to the mentioned three statements, or statements equivalent to any combination of one or more of one or more insert statements, one or more update statements, and one or more delete statements. Any statement that in any way modifies the contents of the data in a database system (including modifying the contents of one or more tables in a relational database) may in some embodiments be identified as a database modification statement by the database modification estimation program at step 400, even if the statement performs operations other than modification of the contents of the data in the database system.

The database modification estimation program identifies one or more operational unit indicators at step 401. In some embodiments, the operational unit indicators comprise one or more recovery log records. In some embodiments, the operational unit indicators comprise one or more recovery log control intervals, where a recovery log control interval is a unit of physical storage of recovery log (such as a physical log block). In some embodiments, the operational unit indicators comprise all or parts of the rows affected by a database modification statement. Any input or output of one or more database modification statements' execution may in some embodiments in whole or in part serve as the basis for formulating one or more operational unit indicators identified by the program at step 401. Any entity whose changing status might indicate any discernable hints about the progression of one or more database modification statements' execution may in some embodiments serve as the basis for formulating one or more operational unit indicators.

The database modification estimation program determines an anticipated operational size of one or more database modification statements at step 402. In some embodiments, the one or more database modification statements comprise one or more elements selected from the group consisting of one or more update statements and one or more delete statements and determining the anticipated operational size comprises accessing one or more pieces of statistic information. Estimating the anticipated operational size of one or more database modification statements based on statistic information is enabled by the prior art, such as the capabilities for maintaining data organization and statistics in IBM®'s DB2 for z/OS® 11.0.0. In some embodiments, determining the anticipated operational size of one or more database modification statements is accomplished through obtaining that value from the combination of at least one of requesting the value from a software framework (such as a DBMS), using pre-defined values to determine the anticipation size, or using historical statistics provided to the program to determine the anticipated operational size.

In some embodiments, the database modification estimation program determines an anticipated operational size of one or more database modification statements based on statistic information about database system that are dynamically updated based on one or more features of database system at one or more times; while in other embodiments the program determines an anticipated operational size of one or more database modification statements based on static statistic information that are not dynamically updated based on one or more features of database system at one or more times. In some embodiments, the database modification estimation program determines an anticipated operational size of one or more database modification statements based on one or more pre-defined values. In an exemplary embodiment, the program always determines that an insert statement has an anticipated operational size of 6.

In some embodiments, the one or more database modification statements comprise one or more insert statements and the anticipated operational size is one. In at least some of those embodiments, the anticipated total execution time of the one or more database modification statements is equal to the anticipated operational throughput rate.

The database modification estimation program determines an anticipated operational throughput rate at step 403. The anticipated operational throughput rate is a rate at which the one or more operational unit indicators are expected to be generated. In some embodiments, the program determines an anticipated operational throughput rate based on the rate at which log records or log control intervals are generated, wherein a log control interval is a unit of physical storage of recovery log (i.e. a physical log block). In some embodiments, the program formats the contents of one or more recovery logs. In some embodiments, the program determines an anticipated operational throughput rate based on the rate at which operational unit indicators of types other than log records and log control intervals are generated.

In some embodiments, the database modification estimation program determines an anticipated operational throughput rate based on the rate at which one or more operational unit indicators of one type and one or more operational unit indicators of another type are generated. In general, some embodiments of the present invention may determine an anticipated operational throughput rate based on the rate at which operational unit indicators of one or more different types are generated. In an exemplary embodiment, the program determines an anticipated operational throughput rate based on the rate at which one or more log records, one or more log control intervals, and one or more affected rows are generated. In some embodiments, the program uses pre-defined guidelines in calculating an anticipated operational throughput rate based on the rate at which operational unit indicators of one or more different types are generated. In an exemplary embodiment, the program averages the value of the rate at which one or more log records are generated, the value of the rate at which one or more log control intervals are generated, and the value of the rate at which one or more affected rows are generated to get an anticipated operational throughput rate. In some embodiments, the database modification estimation program further includes formatting one or more recovery logs. In some embodiments, determining an anticipated operational throughput rate comprises receiving that value from a software framework, such as a DBMS.

In some embodiments, the database modification estimation program determines an anticipated operational throughput rate based on statistic information about database system that are dynamically updated based on one or more features of database system at one or more times; while in other embodiments the program determines an anticipated operational size based on static statistic information that are not dynamically updated based on one or more features of database system at one or more times. In some embodiments, the database modification estimation program determines an anticipated operational size based on one or more pre-defined values. In an exemplary embodiment, the program always determines an anticipated operational throughput rate of 10 log records per second between 8 PM and 8 AM local time, and always determines an anticipated operational throughput rate of 6 log records per second between 8 AM and 8 PM local time. In some embodiments, the program determines and/or adjusts an anticipated operational throughput rate based on additional factors, such as one or more of the traffic in the database systems at a sufficiently recent range of time (e.g. during the last five minutes), the number of errors generated by the DBMS at a sufficiently recent range of time, and the historic record of anticipated operational throughput rate available to the program. In some embodiments, the program determines and/or adjusts an anticipated operational throughput rate based on one or more factors in accordance with guidelines available to it on how to weigh some or all of the factors in the calculation of an anticipated operational throughput rate.

The database modification estimation program determines an anticipated total execution time of one or more database modification statements at step 404. In some embodiments, the program determines an anticipated total execution time of one or more database modification statements by multiplying the determined anticipated operational size and the determined anticipated operational throughput rate. In some embodiments, the program determines and/or adjusts an anticipated operational total execution time of one or more database modification statements based on additional factors, such as one or more of the traffic in the database systems at a sufficiently recent range of time (e.g. during the last five minutes), the number of errors generated by the DBMS at a sufficiently recent range of time, the historic record of anticipated operational total execution time of all or some database modification statements, and one or more relative cost factors associated with the one or more database modification statements.

In some embodiments, the database modification estimation program determines and/or adjusts an anticipated total execution time of one or more database modification statements based on one or more factors in accordance with guidelines available to it on how to weigh one or more of the factors in the calculation of the anticipated total execution time. In an exemplary embodiment, the program determines an anticipated total execution of one or more database modification statements by multiplying the anticipated total operational size of the statements by the anticipated operational throughput rate of the database system at one time and an adjustment factor. The adjustment factor is the average of the adjustment value of the one or more database modification statements. The adjustment value of an insert statement is 1.5, the adjustment value of an update statement is 1.0, and the adjustment value of a delete statement is 0.5.

In some embodiments, the database modification estimation program receives one or more progress indicators denoting the total number of the operational unit indicators successfully generated and determines a progress ratio indicator based on the anticipated operational size and the one or more progress indicators. In some embodiments, the program determines the progress ratio indicator by averaging the one or more progress indicators and dividing the average value by the anticipated operational size. In some embodiments, the program may assign weights to the one or more progress indicators and divide a weighted average of the one or more progress indicators by the anticipated operational size. In some embodiments, the program may divide a median of the one or more progress by the anticipated operational size. In general, the program may divide any value that is calculated and/or selected at least in part based on at least one of the progress indicators by the anticipated operational size to determine a progress ratio indicator.

In some embodiments, the database modification estimation program determines and/or adjusts a progress ratio indicator based on one or more factors in accordance with guidelines available to it on how to weigh each factor in the calculation of the progress ratio indicator. In an exemplary embodiment, the program determines a progress ratio indicator by dividing an average of the value of the one or more progress indicators by the anticipated operational size, and then multiplies this value by an adjustment factor. The adjustment factor is the average of the adjustment value of the one or more database modification statements that the program identifies at step 400. The adjustment value of an insert statement is 1.1, the adjustment value of an update statement is 1.0, and the adjustment value of a delete statement is 0.9. In some embodiments, receiving one or more progress indicators comprises receiving those information and/or values from a software framework, such as a DBMS.

In some embodiments, the database modification estimation program estimates some execution properties of database modification statements through using the operational records caused to be generated by the modifications implemented as a result of those statements as well as the statistical information produced about database system behavior. Because both of those features (i.e. operational record generation for database modifications and production of statistical information) are commonly available in modern database systems and offered by many prevalent DBMSs, the program gives the user useful information about database system behavior without the need to implement major changes in the software or hardware architecture of the current database systems.

In addition, some embodiments of the present invention allow for estimation of total execution time even when either or both of the operational records and the statistical information are not available through, for instance, relying on pre-defined values and historical statistics to determine values of the anticipated operational size and the anticipated operational throughput rate. As such, some embodiments of the present invention allow for estimation of database modification statement execution time even in less advanced database systems in a manner closely aligned to estimation of database modification statement execution time in more advanced database systems.

Finally, the database modification estimation program relies on the features of database modification statements prevalent in database systems (such as the presence of recovery log records or other operational records) to solve the problem of estimating some execution properties of those statements, thus resolving problems created by absence of clear parallels between mechanisms used for estimating some execution properties of database retrieval statements and the functional context of the execution of database modification statements. Nevertheless, the aforementioned advantages are not required to be present in all of the embodiments of the invention and may not be present in all of the embodiments of the invention.

Figure 6:
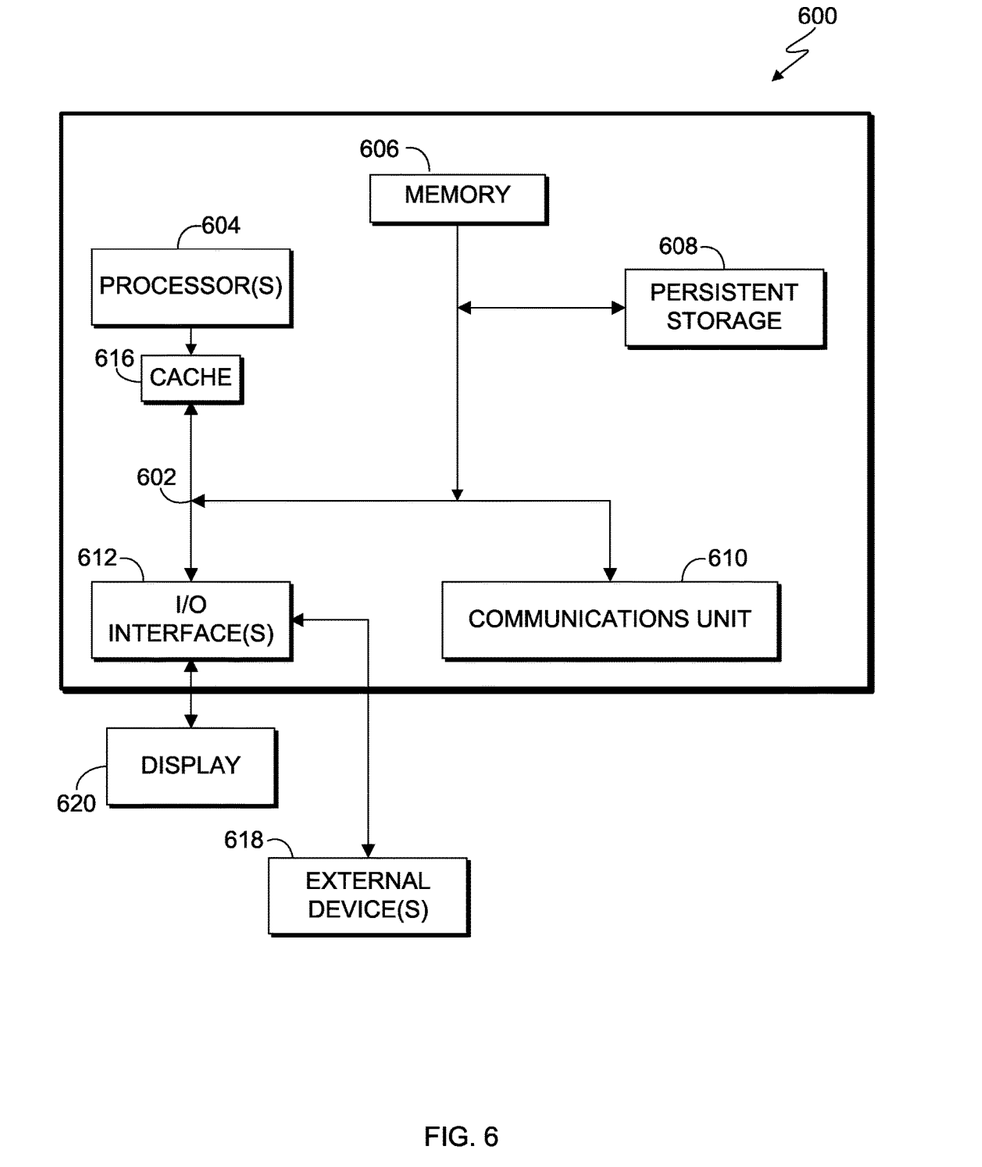
FIG. 6 is a block diagram of a computing apparatus suitable for executing a database modification estimation program, in accordance with at least one embodiment of the present invention.

FIG. 6 is a block diagram depicting components of a computer 600 suitable for executing the database modification estimation program. FIG. 6 displays the computer 600, the one or more processor(s) 604 (including one or more computer processors), the communications fabric 602, the memory 606, the RAM, the cache 616, the persistent storage 608, the communications unit 610, the I/O interfaces 612, the display 620, and the external devices 618. It should be appreciated that FIG. 6 provides only an illustration of one embodiment and does not imply any limitations with regard to the environments in which different embodiments may be implemented. Many modifications to the depicted environment may be made.

As depicted, the computer 600 operates over a communications fabric 602, which provides communications between the cache 616, the computer processor(s) 604, the memory 606, the persistent storage 608, the communications unit 610, and the input/output (I/O) interface(s) 612. The communications fabric 602 may be implemented with any architecture suitable for passing data and/or control information between the processors 604 (e.g. microprocessors, communications processors, and network processors, etc.), the memory 606, the external devices 618, and any other hardware components within a system. For example, the communications fabric 602 may be implemented with one or more buses or a crossbar switch.

The memory 606 and persistent storage 608 are computer readable storage media. In the depicted embodiment, the memory 606 includes a random access memory (RAM). In general, the memory 606 may include any suitable volatile or non-volatile implementations of one or more computer readable storage media. The cache 616 is a fast memory that enhances the performance of computer processor(s) 604 by holding recently accessed data, and data near accessed data, from memory 606.

Program instructions for the database modification estimation program may be stored in the persistent storage 608 or in memory 606, or more generally, any computer readable storage media, for execution by one or more of the respective computer processors 604 via the cache 616. The persistent storage 608 may include a magnetic hard disk drive. Alternatively, or in addition to a magnetic hard disk drive, the persistent storage 608 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of the persistent storage 608.

The communications unit 610, in these examples, provides for communications with other data processing systems or devices. In these examples, the communications unit 610 may include one or more network interface cards. The communications unit 610 may provide communications through the use of either or both physical and wireless communications links. The database modification estimation program may be downloaded to the persistent storage 608 through the communications unit 610. In the context of some embodiments of the present invention, the source of the various input data may be physically remote to the computer 600 such that the input data may be received and the output similarly transmitted via the communications unit 610.

The I/O interface(s) 612 allows for input and output of data with other devices that may operate in conjunction with the computer 600. For example, the I/O interface 612 may provide a connection to the external devices 618, which may include a keyboard, keypad, a touch screen, and/or some other suitable input devices. External devices 618 may also include portable computer readable storage media, for example, thumb drives, portable optical or magnetic disks, and memory cards. Software and data used to practice embodiments of the present invention may be stored on such portable computer readable storage media and may be loaded onto the persistent storage 608 via the I/O interface(s) 612. The I/O interface(s) 612 may similarly connect to a display 620. The display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, comprising:
one or more computer readable storage media and program instructions stored on said one or more computer readable storage media, said program instructions comprising instructions to:
identify one or more database modification statements;
identify one or more recovery logs, said one or more recovery logs being caused to be generated as a result of execution of said one or more database modification statements;
identify one or more operational unit indicators within said one or more recovery logs, said one or more operational unit indicators being caused to be generated within said one or more recovery logs as a result of execution of said one or more database modification statements;
determine an anticipated operational size, said anticipated operational size being an estimated total number of said one or more operational unit indicators;
determine an anticipated operational throughput rate, said anticipated operational throughput rate being a rate at which said one or more operational unit indicators are expected to be generated within said one or more recovery logs, said anticipated operational throughput rate being based on a number of operational units generated within said one or more recovery logs during a particular time interval; and
determine an anticipated total execution time of said one or more database modification statements based on said anticipated operational size and said anticipated operational throughput rate.

2. The computer program product of claim 1, wherein said program instructions further comprise instructions to format the contents of said one or more recovery logs, wherein said formatting comprises marking said one or more operational unit indicators within said one or more recovery logs as separate from one another.

3. The computer program product of claim 1, wherein said one or more operational unit indicators comprise one or more recovery log records.

4. The computer program product of claim 1, wherein said one or more operational unit indicators comprise one or more recovery log control intervals.

5. The computer program product of claim 1, wherein said program instructions further comprise instructions to:

receive one or more progress indicators, said one or more progress indicators denoting the total number of said one or more operational unit indicators successfully generated; and determine a progress ratio indicator based on said anticipated operational size and said one or more progress indicators.

6. The computer program product of claim 1, wherein:
said one or more database modification statements comprise one or more elements selected from the group consisting of one or more update statements and one or more delete statements; and
said instructions to determine said anticipated operational size comprise instructions to access one or more pieces of statistic information.

7. The computer program product of claim 1, wherein:
said one or more database modification statements comprise one or more insert statements; and
said anticipated operational size is one.

8. The computer program product of claim 1, wherein:
said one or more operational unit indicators comprise operational unit indicators of a first type and operational unit indicators of a second type; and
determining said anticipated operational throughput rate further comprises averaging values of a rate at which said first type of operational unit indicators are generated and a rate at which said second type of operational unit indicators are generated.

9. The computer program product of claim 8, wherein:
said one or more operational unit indicators further comprise operational unit indicators of a third type;
said averaged values further comprise a rate at which said third type of operational unit indicators are generated; and
said one or more operational unit indicators of said first type, said second type, and said third type comprise one or more log records, one or more log control intervals, and one or more affected rows.

10. The computer program product of claim 1, wherein determining said anticipated total execution time of said one or more database modification statements is further based on an adjustment factor, wherein said adjustment factor is based on respective adjustment values for each of said one or more database modification statements.

11. A computer system, comprising:
a processor;
one or more computer readable storage media;
computer program instructions;
said computer program instructions being stored on said one or more computer readable storage media; and
said computer program instructions comprising instructions to:
identify one or more database modification statements;
identify one or more recovery logs, said one or more recovery logs being caused to be generated as a result of execution of said one or more database modification statements;
identify one or more operational unit indicators within said one or more recovery logs, said one or more operational unit indicators being caused to be generated within said one or more recovery logs as a result of execution of said one or more database modification statements;
determine an anticipated operational size, said anticipated operational size being an estimated total number of said one or more operational unit indicators;
determine an anticipated operational throughput rate, said anticipated operational throughput rate being a rate at which said one or more operational unit indicators are expected to be generated within said one or more recovery logs, said anticipated operational throughput rate being based on a number of operational units generated within said one or more recovery logs during a particular time interval; and
determine an anticipated total execution time of said one or more database modification statements based on said anticipated operational size and said anticipated operational throughput rate.

12. The computer system of claim 11, wherein said computer program instructions further comprise instructions to format the contents of said one or more recovery logs, wherein said formatting comprises marking said one or more operational unit indicators within said one or more recovery logs as separate from one another.

13. The computer system of claim 11, wherein said one or more operational unit indicators comprise one or more recovery log records.

14. The computer system of claim 11, wherein said computer program instructions further comprise instructions to:
receive one or more progress indicators, said one or more progress indicators denoting the total number of said one or more operational unit indicators successfully generated; and
determine a progress ratio indicator based on said anticipated operational size and said one or more progress indicators.

15. The computer system of claim 11, wherein:
said one or more database modification statements comprise one or more elements selected from the group consisting of one or more update statements and one or more delete statements; and
said instructions to determine said anticipated operational size comprise accessing one or more pieces of statistic information.

16. The computer system of claim 11, wherein:
said one or more database modification statements comprise one or more insert statements; and
said anticipated operational size is one.

17. The computer system of claim 11, wherein said one or more operational unit indicators comprise one or more recovery log control intervals.

18. The computer system of claim 11, wherein:
said one or more operational unit indicators comprise operational unit indicators of a first type and operational unit indicators of a second type; and
determining said anticipated operational throughput rate further comprises averaging values of a rate at which said first type of operational unit indicators are generated and a rate at which said second type of operational unit indicators are generated.

19. The computer system of claim 18, wherein:
said one or more operational unit indicators further comprise operational unit indicators of a third type;
said values further comprise a rate at which said third type of operational unit indicators are generated; and
said one or more operational unit indicators of said first type, said second type, and said third type comprise one or more log records, one or more log control intervals, and one or more affected rows.

20. The computer system of claim 11, wherein determining said anticipated total execution time of said one or more database modification statements is further based on an adjustment factor, wherein said adjustment factor is based on respective adjustment values for each of said one or more database modification statements.

* * * * *